(12) United States Patent
Obrecht

(10) Patent No.: US 7,630,919 B1
(45) Date of Patent: Dec. 8, 2009

(54) METHOD AND APPARATUS FOR PRODUCING GOODS IN AN AUTOMATED MANNER

(76) Inventor: Wells Obrecht, 509 Edgevale Rd., Baltimore, MD (US) 21210

( * ) Notice: Subject to any disclaimer, the term of this patent is extended or adjusted under 35 U.S.C. 154(b) by 987 days.

(21) Appl. No.: 08/900,360

(22) Filed: Jul. 25, 1997

Related U.S. Application Data

(60) Provisional application No. 60/023,282, filed on Jul. 25, 1996.

(51) Int. Cl.
*G06Q 30/00* (2006.01)
(52) U.S. Cl. .......................... 705/26; 705/11
(58) Field of Classification Search ............... 705/26, 705/27, 37, 7, 10, 11
See application file for complete search history.

(56) References Cited

U.S. PATENT DOCUMENTS

| | | | |
|---|---|---|---|
| 4,677,552 A | | 6/1987 | Sibley, Jr. |
| 4,789,928 A | * | 12/1988 | Fujisaki ....................... 705/37 |
| 4,799,156 A | * | 1/1989 | Shavit et al. .................. 705/26 |
| 4,992,940 A | | 2/1991 | Dworkin |
| 5,060,165 A | | 10/1991 | Schumacher et al. |
| 5,063,506 A | | 11/1991 | Brockwell et al. |
| 5,243,515 A | | 9/1993 | Lee |
| 5,319,542 A | | 6/1994 | King, Jr. et al. |
| 5,402,336 A | | 3/1995 | Spiegelhoff et al. |
| 5,493,490 A | * | 2/1996 | Johnson ....................... 705/26 |
| 5,592,375 A | * | 1/1997 | Salmon et al. ................ 705/7 |
| 5,745,882 A | * | 4/1998 | Bixler et al. .................. 705/26 |
| 5,758,328 A | * | 5/1998 | Giovannoli ................... 705/26 |
| 5,765,138 A | * | 6/1998 | Aycock et al. ................ 705/7 |
| 5,774,873 A | * | 6/1998 | Berent et al. .................. 705/26 |
| 5,842,178 A | * | 11/1998 | Giovannoli ................... 705/26 |
| 6,006,201 A | * | 12/1999 | Berent et al. .................. 705/27 |

OTHER PUBLICATIONS

Hall, Evelyn. "Insurers venture onto the Internet web." Best's Review, v. 96, n. 3, pp. 28-31+, Jul. 1995.*
"Consumers buy cars via Auto-By-Tel." Link-Up, v. 13, n. 3, p. 15, May 1996.*
Frye, Colleen. "EDI users explore Internet as tool of trade." Software Magazine, v. 15, n. 13, pp. 82-89, Dec. 1995.*
Taylor, Alex III. "This guy's history!" Medical Economics, v. 73, n. 9, pp. 202-212, May 1996.*
Proctor, Paul. "Expert, Electronic Procurement," Aviation Week & Space Technology, v. 144, n. 26, p. 13, Jun. 1996.*

(Continued)

*Primary Examiner*—Susanna M Diaz
(74) *Attorney, Agent, or Firm*—Birch, Stewart, Kolasch & Birch, LLP

(57) ABSTRACT

An automatic system and method optimizes the purchasing of goods and services by a buyer. A request for a quote for goods or services required is received from a buyer. This request is processed and dealers are selected based on the criteria of the buyer and other criteria. The selected dealers are then sent the request for goods and services and quotes are solicited. Quotes from the selected dealers, for the goods or services, are then receivable within a predetermined time period. Thereafter, the received quotes of the providers of the goods or services are ranked. The ranking and the report of the providers are then outpribed in steps $S_2$ and $S_3$ of FIG. 2.

17 Claims, 16 Drawing Sheets

OTHER PUBLICATIONS

Parker, Kevin. "20: TSW International." Manufacturing Systems, v. 14, n. 7, p. 111, Jul. 1996.*

"GEIS launches TPNPost, a net-based sourcing solution." Electronic Buyer's News, n. 1015, p. 68, Jul. 1996.*

Tauhert, Christy. "ITSA, ISI alliance promotes point-of-sale underwriting." Insurance & Technology, v. 21, n. 12, p. 13, Dec. 1996.*

Interactive Buyers Net: Buyer/Seller Interactive Software Inc. acquired, new software introduced. Business Wire (Aug. 22, 1995), retrieved from Dialog, file 810, accession No. 0511019.*

IBNL announces signing of more than $8 billion in buying power. Business Wire (Nov. 15, 1995), retrieved from Dialog 649, accession No. 02111617.*

IBNL declares 20 percent stock dividend: Source Interactive Software systems operational. Business Wire (Dec. 14, 1995), retrieved from Dialog file 649, accession No. 02121734.*

IBNL forges into the future of buying and selling with Source Interactive software. PR Newswire (Jan. 10, 1996), retrieved from Dialog, file 649, accession No. 02130795.*

IBNL restructures capitalization; adds proven management; releases its new "Virtual Source" software. Business Wire (Nov. 12, 1996), retrieved from Dialog 16, accession No. 04677353.*

Vsource webpage (www.vsource.net/new_web/vhome.htm) screen shots, no date [retrieved on Feb. 7, 2000].*

Kashiwagi, Dean, Development of a Performance Based Design/Procurement System for Nonstructural Facility Systems, Arizona State University, Dec. 1991.*

McKenzie, Kevin. "Car Sales Firm Represents Buyers Looking For a Good Deal." Commercial Appeal (Memphis), Business Section, p. B3, Jul. 6, 1992.*

Barciela, Susana. "Need a Car But Hate To Haggle? Service Will Negotiate for You." Miami Herald, Business Section, p. 31BM, Mar. 23, 1992.*

"Southern California Gets New Service that Makes Car Dealers Bid for Customers' Business." PR Newswire, p. 0128A4482, Jan. 28, 1992.*

Laugesen, Wayne. "Here's a New Way of Buying a Car." Consumers' Research Magazine, vol. 75, No. 9, p. 21(3), Sep. 1992.*

Anonymous. "Honestly the Best Policy." British Telecom Journal, vol. 8, No. 3, pp. 32-33, 1987.*

Reilly, Bob. "Firms Join Virtual Marketplace." Mesa Tribune, Section G, p. 1, Jul. 16, 1994.*

"Shopping on the Internet and Beyond!", Jaclyn Easton, pp. 29-41 (1995).

InfoQuote (1996).

* cited by examiner

A: Identification Information:

Customer Name: _____
Mail Address: _____
City: _____ State: ____
Zip: ____ Apt. Num.: ____
Phone (over next 3 hrs): ( )
Fax Number: ( )
I wish to receive my Report by:  Fax ☐  Overnight Mail ☐

B: Vehicle Specifications (in preference order)

| Make | Model | Doors | Series | Style/Class |
|---|---|---|---|---|
| *Example;* | Ford Taurus | 4 | LX | Sedan |
|  |  |  |  |  |
|  |  |  |  |  |
|  |  |  |  |  |

Range of Years  From ____ To ____
Range of Miles  From ____ To ____
Range of Price  From $____ To $____
Exterior Color Choices  ____ or ____
Interior Color Choices  ____ or ____

C: Accessories Requested:

- 4 Wheel Drive (4WD) ☐
- Air Conditioning ☐
- ABS Brakes ☐
- Air bag - Driver side ☐
- Air bag - Passenger side ☐
- Alarm ☐
- All Wheel Drive ☐
- Alloy wheels ☐
- AM/FM Radio ☐
- Cassette ☐
- CD Player ☐
- Cruise Control ☐
- Leather Seats ☐
- Power Locks ☐
- Power Steering ☐
- Power windows ☐
- Roof Rack ☐
- Sun Roof - Power ☐
- Sun Roof - Manual ☐
- Tilt Steering ☐
- Tow Package ☐
- Transmission - Auto ☐
- Transmission - Manual ☐
- Other: _____ ☐
- Other: _____ ☐

D: Financing Information:

Possible Payment Methods:  Loan ☐  Lease ☐  Cash ☐
*Check all that apply*
Preferred Term of Loan ____ Months
Preffered Term of Lease ____ Months
If Financing estimate your Down Payment  $____

E: Potential Aftermarket Sales:

|  | YES | NO | MAYBE |
|---|---|---|---|
| I am interested in buying: |  |  |  |
| Extended Warranty | ☐ | ☐ | ☐ |
| GAP Insurance | ☐ | ☐ | ☐ |
| Rust Protection | ☐ | ☐ | ☐ |
| Credit Life Insurance | ☐ | ☐ | ☐ |
| Accident and Health Insurance | ☐ | ☐ | ☐ |

*There is no obligation to purchase any of the above items*

F: Potential Trade-In Information:

(Describe your car here if you might trade it in.)
Make/Model: _____
Year: _____
Miles on Vehicle: _____
Doors: ____  Series: _____
Style/Class: _____
Color - Exterior: _____  Interior: _____
Condition - Exterior: _____  Interior: _____

(Check box if your vehicle has any of the following items in working condition)

| A/C ☐ | Power Locks ☐ | Pwr Steering ☐ |
| Leather Seats ☐ | CD ☐ | Tow Package ☐ |
| Pwr Sun Roof ☐ | 4WD ☐ | Roof Rack ☐ |
| Auto Transmission ☐ | Cruise Control ☐ | _____ ☐ |
| Convertible ☐ | Air bags ☐ | _____ ☐ |

*There is no obligation to sell your vehicle to any dealership*

G: Payment of $20 to Service by:

*Add $10 if requesting overnight mail delivery*
Select Credit Card:  Visa ☐  Mastercard ☐  Amer. Exp. ☐
Acct Num _____  Ex date: _____
Billing Address: Street _____ Apt # _____
City _____ Zip _____

FIG.10

Identification Information:

| | | |
|---|---|---|
| Report Number | (8 digits) | |
| Dealership ID | (7 digits) | |
| Dealership Name | | |
| NAQS Manager PIN | (4 digits) | |
| This Vehicle must be Advertised | YES ☐ NO ☐ | |

Dealers are entitled to one "guaranteed"ad per Report. If "YES" - ad will be printed. If "NO" - ad printed only if it better matches the consumer's request versus other vehicles. This option may not be activated for your dealership.

Vehicle Location:

On our lot ☐    Wholesellers lot ☐
Stock Number
Delivery Date    7/16/96
Price Hold           Physical Hold
(Days you will hold Price)    (Hours you will hold vehicle if cust. calls)

Vehicle Specifications:

| | | | |
|---|---|---|---|
| Model Year | (1994) | | |
| Make | (FORD) | | |
| Model | (TAURUS) | | |
| Doors | (4) | Series | (GL) |
| Style (or Class) | (Sedan) | | |
| Miles | (Do not incl. 1/10s) | | Cyld's |
| Exterior Color | (Blue) | | |
| Interior Color | (Grey) | | |

(Use base common names for colors - light red, dark blue, medium green)

Accessories Included:

Put an "X" in box if the vehicle contains the following

| | | | |
|---|---|---|---|
| 4WD | ☐ | Leather Seats | ☐ |
| A/C | ☐ | Pwr Locks | ☐ |
| ABS Brakes | ☐ | Pwr Steering | ☐ |
| Air bag - Drvr | ☐ | Pwr Windows | ☐ |
| Air bag - Pssgr | ☐ | Roof Rack | ☐ |
| Alarm | ☐ | Sun Roof - Power | ☐ |
| All Wheel Drive | ☐ | Sun Roof - Manual | ☐ |
| Alloy Wheels | ☐ | Tilt Steering | ☐ |
| AM/FM Radio | ☐ | Tow Pckge | ☐ |
| Cassette | ☐ | Trans - Auto | ☐ |
| CD Player | ☐ | Trans - Manual | ☐ |
| Cruise Cntrl | ☐ | Other: _____ | ☐ |

Pricing Information:

| | | |
|---|---|---|
| On-The-Road Price | $ | |
| Price Includes Warranty | Yes ☐ | No ☐ |
| Warranty: Miles | | Days |
| Type of Coverage | | |
| Money-back guarantee: | Yes ☐ | Days |

Financing Information:

Assume a "Best Credit" situation for every customer. Dealers are not authorized by NAQS to run credit reports on NAQS consumers. This fact is relayed to the customer.

| | | | |
|---|---|---|---|
| Loan Approved | Yes ☐ | No ☐ | Not Checked ☐ |
| Amount Financed | $ | | |
| Financing Rate | | % | |
| Monthly Payments | $ | | |
| Term of Loan | | | Months |
| Down Payment | $ | | |

Leasing Information:

Not applicable for used car advertising.

| | | | |
|---|---|---|---|
| Lease Approved | Yes ☐ | No ☐ | Not Checked ☐ |
| Capitalized Cost | $ | | |
| Monthly Payments | $ | | |
| Term of Lease | | | Months |
| Refundable Deposit | $ | | |
| Down Payment | $ | | |
| Residual Value $$ | $ | | |
| Money Factor (Int. Rate) | | % | |
| Mileage Cap | | | |
| Cost/Mile > Cap | $ | | Cents/Mile |

Additional Comments

(Maximum 30 spaces)

Manager's Signature or ID Code:

_____    Date

"On-The-Road" price includes all tax, tag, registration, freight, preparation, destination, advertising, and lien fees (when applicable).
Please use black ink pen to fill out form. NAQS is not responsible for errors or omissions.

FIG.13

USED CARS:

How vehicles are selected for advertising when more than 14 are submitted.
1. All incoming vehicles are rated by our proprietary system for how closely they match the customer's request.
2. On each Report, *individual* dealers are limited to 3 ads. Dealer *families* are limited to 5 ads.
3. If requested on the "Quote Form", each dealership is guaranteed one (1) ad printed on The Auto Quote Report.
4. The remaining spots are awarded to the vehicles that rate highest.
5. In the event of a ratings tie, the vehicles with the lowest OTR prices are selected.
6. Vehicles are organized on The Auto Quote Report in order of the proprietary rating.

| Match | Weighting | Match | Weighting |
|---|---|---|---|
| Model | 80 | Year Range [3] | 7 |
| Series [1] | 40 | Mileage Range [4] | 7 |
| Style (or Class) | 30 | Ext. Color [5] | 6 |
| Price Range [2] | 15 | Transmission (Auto/Man.) | 5 |
| Zone customer requested [5] | 10 | A/C [6] | 4 |
| 4WD [5] | 9 | Leather [6] | 4 |
| Doors [5] | 9 | Other Listed [6] | 2 |
| | | Other Unlisted [6] | Set by buyer |

NOTES:
(1) "Series" match only awarded points if same model vehicle
(2) Price Range: Points are awarded if less than maximum.
(3) Year Range: Points are awarded if within range only.
(4) Mileage Range: Points are awarded if less than maximum.
(5) Points are awarded for exact matches only.
(6) Points are awarded for positive matches only.

FIG.14

REPORT

| VEHICLES REQUESTED: | CUSTOMER INFORMATION: |
|---|---|
| FORD TAURUS<br>MERC. SABLE<br>RED/GREY<br>RECEIVE BY: FAX<br>REPORT NUMBER: 07123456 | JANE DOE<br>CUSTOMER NUMBER: 123456 |

| | A | B | C |
|---|---|---|---|
| RANK | | | |
| SELLER | 13 | 12 | 14 |
| VEHICLE INFORMATION | | | |
| MAKE, MODEL | Ford Taurus | Merc. Sable | Ford Taurus |
| DOORS, SERIES, STYLE | 4Dr. GL Sedan | 4Dr. GS Sedan | 4Dr. GL Sedan |
| YEAR | 1992 | 1995 | 1994 |
| MILES | 75,125 | 29,941 | 45,025 |
| EXTERIOR/INTERIOR COLOR | Blue / Grey | Red / Grey | Green / Grey |
| STOCK NUMBER | 56980 | 25180 | 56980 |
| Your "On-the-road" Price | $8,300 | $11,900 | $13,112 |
| Location of lot | | | |
| Location of vehicle | Our lot | Another lot | Our lot |
| WARRANTY - INFO. | | | |
| Price includes Warranty | | Yes | |
| Warranty duration (lesser of days/miles) | | 360 / 25000 | |
| Type of coverage | | corrosion | |
| Money-back Guarantee / Days | Yes / 5 days | | |
| Price Hold (days) | 2 | 4 | 3 |
| Physical Car hold (hours) | 5 | 7 | 3 |
| FINANCING INFO. | | | |
| Loan Approved | Not Checked | Not Checked | Not Checked |
| Financing Rate (assumes "best credit") | 8.25% | 7.50% | 7.75% |
| Monthly Payments if financed | $148.99 | $218.41 | $244.14 |
| Term of Loan in months | 60 | 60 | 60 |
| Down Payment (not including trade-in) | $1,000.00 | $1,000.00 | $1,000.00 |
| Amount Financed | $7,300.00 | $10,900.00 | $12,112.00 |
| SPECIFICATIONS: | | | |
| 4WD | | | |
| Air Conditioning | Yes | Yes | Yes |
| ABS (Anti-lock) Brakes | | Yes | |
| Air Bags | 1 | 2 | 1 |
| Alarm | Yes | | |
| All Wheel Drive | Yes | Yes | Yes |
| Alloy Wheels | Yes | | Yes |
| AM/FM Radio | Yes | Yes | Yes |
| Cassette Player | | Yes | |
| CD Player | | | Yes |
| Cruise Control | Yes | Yes | Yes |
| Leather Seats | Yes | | |
| Power locks | | | |
| Power Steering | Yes | Yes | Yes |
| Power Windows | | | |
| Roof Rack | Yes | | Yes |
| Sun roof (Manual or Power) | Manual | | |
| Tow Package | Yes | | Yes |
| Transmission (Automatic or Manual) | Automatic | Automatic | Automatic |
| Other Items Included | Door Guards | | Keyless Entry |
| DEALERS COMMENTS | Excellent condition<br>Creampuff | 1 owner | Open 24 Hours<br>Exit 13B off I83 |

FIG.15

METHOD AND APPARATUS FOR PRODUCING GOODS IN AN AUTOMATED MANNER

This application claims the benefit of U.S. Provisional Application No. 60/023,282 filed Jul. 25, 1996.

FIELD OF THE INVENTION

The present invention relates to a method and system for automatically facilitating a consumers procurement process from manufacturers or value-added resellers (VAR's, e.g., sellers) of various types of merchandise (goods) and services. In the present disclosure, the words "consumer," "buyer," and "customer" have been used synonymously. Also the words "seller," "dealer," and "provider" have been used synonymously.

BACKGROUND OF THE INVENTION

Traditionally, the procurement of many goods (e.g., automobiles, computers, appliances, etc.) and services (legal, financing, medical, insurance, etc.) has been a very labor intensive, time consuming, and costly process. For a consumer to find the best value at the lowest price, meeting all additional relevant criteria of the desired goods and/or services (hereinafter goods), the consumer had to personally contact many providers of the goods and then manually (or mentally) compare pictures of the goods versus the price and other criteria offered by each seller or provider. To compare prices and features of similar goods from different providers was a very difficult task for consumers. For example, definitions were not standardized, prices and other criteria may be fixed for only a short period of time. Providers were also reluctant to provide written prices and inventory often changes rapidly. The entire process may have taken weeks and possibly months, depending on the particular goods. In short, the cost of market information regarding goods was often too expensive to enable consumers to make fully informed decisions when buying goods. The burden of gathering information was simply too great for most consumers and as a result, consumers often made inefficient or incorrect purchasing decisions which did not truly reflect the true desires or requirements of the consumers for the goods.

The process of procuring the goods has been simplified recently by the introduction of product locator services. For example, on the internet, several firms enable customers to receive product and pricing information from multiple sellers based on customer-defined information. The seller information is pre-loaded into a database by a specific service firm (or by the seller) and the consumer is granted access to the array of information.

A drawback of the aforementioned procedure is that the information is static. That is, it does not vary dependent on different conditions. Another drawback to this system is that the information is often old and that sellers are not placed in a rigorous live price market competition for the business of the customer. Furthermore, sellers do not like placing information of their entire inventory (especially if prices are included) in the hands of the public because this could viewed by other sellers. This tends to lower the liquidity and efficiency of the market.

Also it is known where firms forward the names of buyers to participating sellers in a region. These buying services usually have some prearranged discount for the consumers who use the service. These services merely refer individual customers to preselected sellers based on geographic location or other criteria.

SUMMARY OF THE INVENTION

It is an object of the present invention to provide an automated new electronic information/procurement system and method for providing a buyer with a medium with which to spontaneously and simultaneously request product information (features, qualities, warranties, price, etc.) from multiple sellers of a product in a selected area.

It is a further object of the present invention to provide a system that avoids indicating to sellers, in advance, when they will be requested to provide market and product information to the buyer. Thus, the sellers might not know in advance the specific goods for which they will be prompted for information.

It is a further object of the present invention to provide a system which automatically selects a plurality of sellers, from which bids will be solicited, based on received criteria from the buyer and seller.

It is a further object of the present invention to provide a completely automated system and method to obtain information for the goods, instead of a manual system for obtaining this information, to ease the burden on the buyer for obtaining goods.

It is a further object of the present invention to provide a system which automatically ranks sellers and selects the ones with the highest ranking based on a plurality of criteria after quotes have been received from the sellers.

It is a further object of the present invention to provide a system which outputs a report of the rankings of the sellers to the buyers with or without other information.

The foregoing and additional objects of this invention are achieved by providing a method for purchasing goods or services from a seller by a buyer comprising the steps of (a) receiving a request from a buyer for goods or services with predetermined criteria related to the goods or services; (b) selecting at least one seller from a predetermined group of sellers of the goods or services based on the received predetermined criteria; (c) transmitting the request of the buyer to the selected at least one seller of the goods or services; (d) receiving, within a predetermined time interval, responses from the sellers to the request; (e) compiling information provided in the responses received from the sellers within the predetermined time interval; (f) ranking the sellers based upon the compiled information and selecting sellers with the relatively highest ranking; and (g) providing the compiled responses of the selected sellers for access by the buyer (h) enabling the consumer (buyer) to purchase the goods or services from the desired seller.

Additionally, the foregoing and additional objects of the present invention are further achieved by providing a system for obtaining information for the purchasing of goods or services comprising input means for receiving a request for desired goods or services from a buyer, the request including predetermined criteria related to the goods or services; selection means for selecting at least two providers from a predetermined group of providers of the goods or services based on the predetermined criteria; transmission means for transmitting the request of the buyer to the selected providers; reception means for receiving, within a predetermined time interval, responses from the selected providers; computation means for compiling information provided in the response received within the predetermined time interval and for ranking the sellers based upon the compiled information, and for selecting sellers with the relatively highest ranking; and output means for providing the compiled responses of the selected sellers for access by the buyer.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 10 is a representative screen of the system used by a buyer for submission of an initial request;

FIG. 13 is a representative screen of the system used by the seller for responding to a buyer request;

FIG. 14 illustrates weighting of seller responses by the system when compiling and ranking seller responses;

FIG. 15 illustrates an output provided with the ranking of sellers in response to a buyer request.

DETAILED DESCRIPTION

Figure 1:
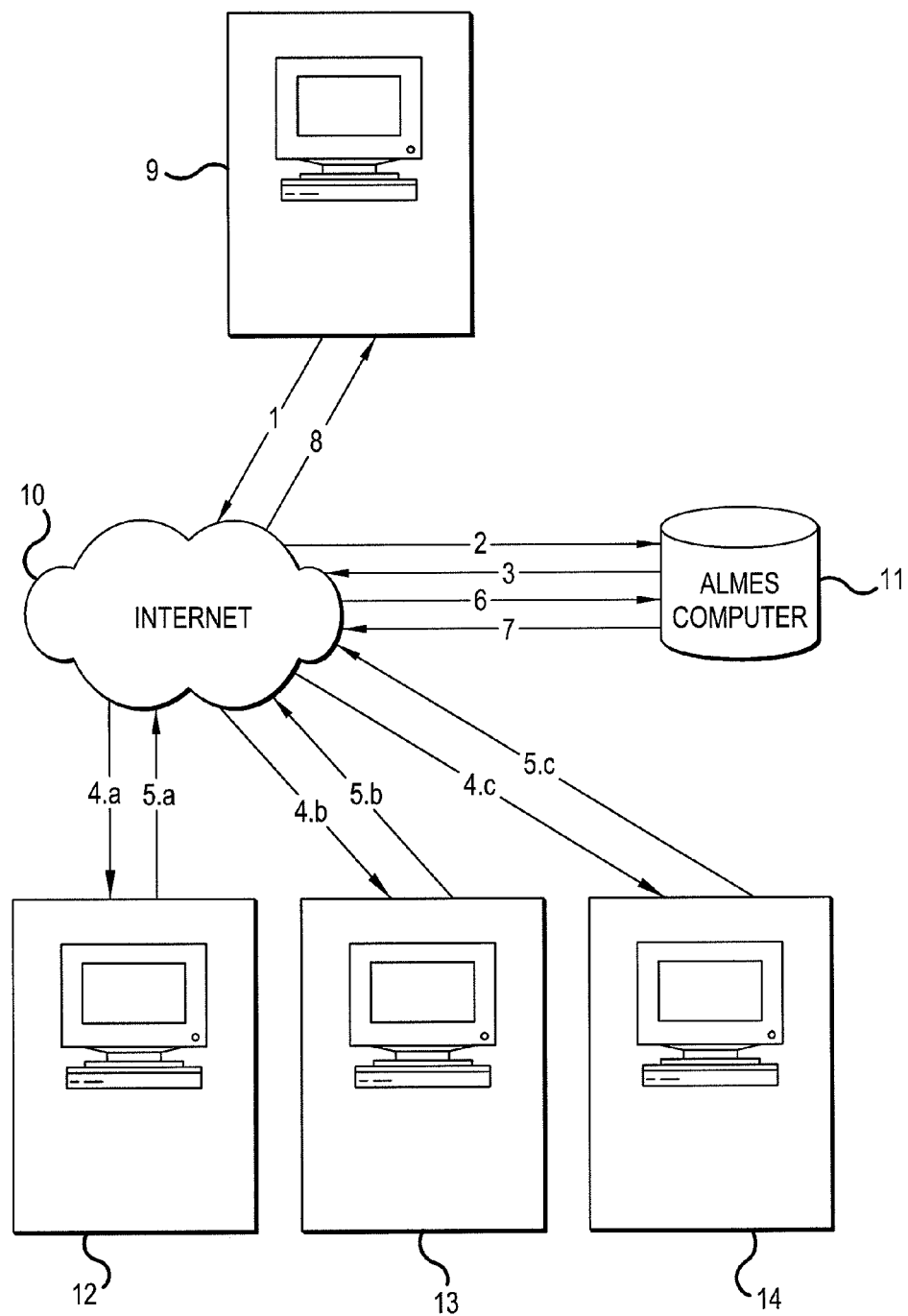
FIG. 1 illustrates the system structure which provides a "real-time" conduit for a buyer to contact sellers and for sellers to respond to a request from the buyer.

FIG. 1 illustrates the structure of the system by which the buyer can contact the seller. The system includes, for example, a computer 9 which receives information input by the buyer including a request for goods or services. The information is transferred via the internet 10 via line 1, to the Automotive Live Market Exchange System (ALMES) computer, which is the central computer 11 of the system. The ALMES computer receives a request from the buyer and operates to select at least two sellers from a plurality of prestored sellers (prestored in a memory, not shown, for example) based on the buyers input request and other criteria related to the sellers, contained in a database stored in memory (not shown). Thereafter, the central computer 11 forwards the buyer request, via the internet 10 (for example), to the selected sellers.

The terminals 12, 13, and 14 of, for example, three sellers are continuously monitoring the internet 10 for requests. The buyer request is then received by terminals of the selected sellers by via lines 4A, 4B, and 4C. While only three terminals have been shown, this is exemplary only. The terminals 12-14, or at least a subset thereof, then communicate via the internet 10 via lines 5A, 5B, and 5C with the central computer 11. This communication includes the response of the seller, based on the request. This information is then received by the ALMES computer 11 via line 6.

Once received, the ALMES computer 11 compiles and ranks the particular sellers based on the information of the responses and additional information contained within the database. The responses of the sellers that are selected by the central computer 11 are then forwarded, via the internet via line 7, to the terminal of the buyer via line 8. The buyer can then review the ranking and determine which response (if any) to accept and then can use the system, for example, to order either directly from a seller or through the ALMES computer.

Figure 2:
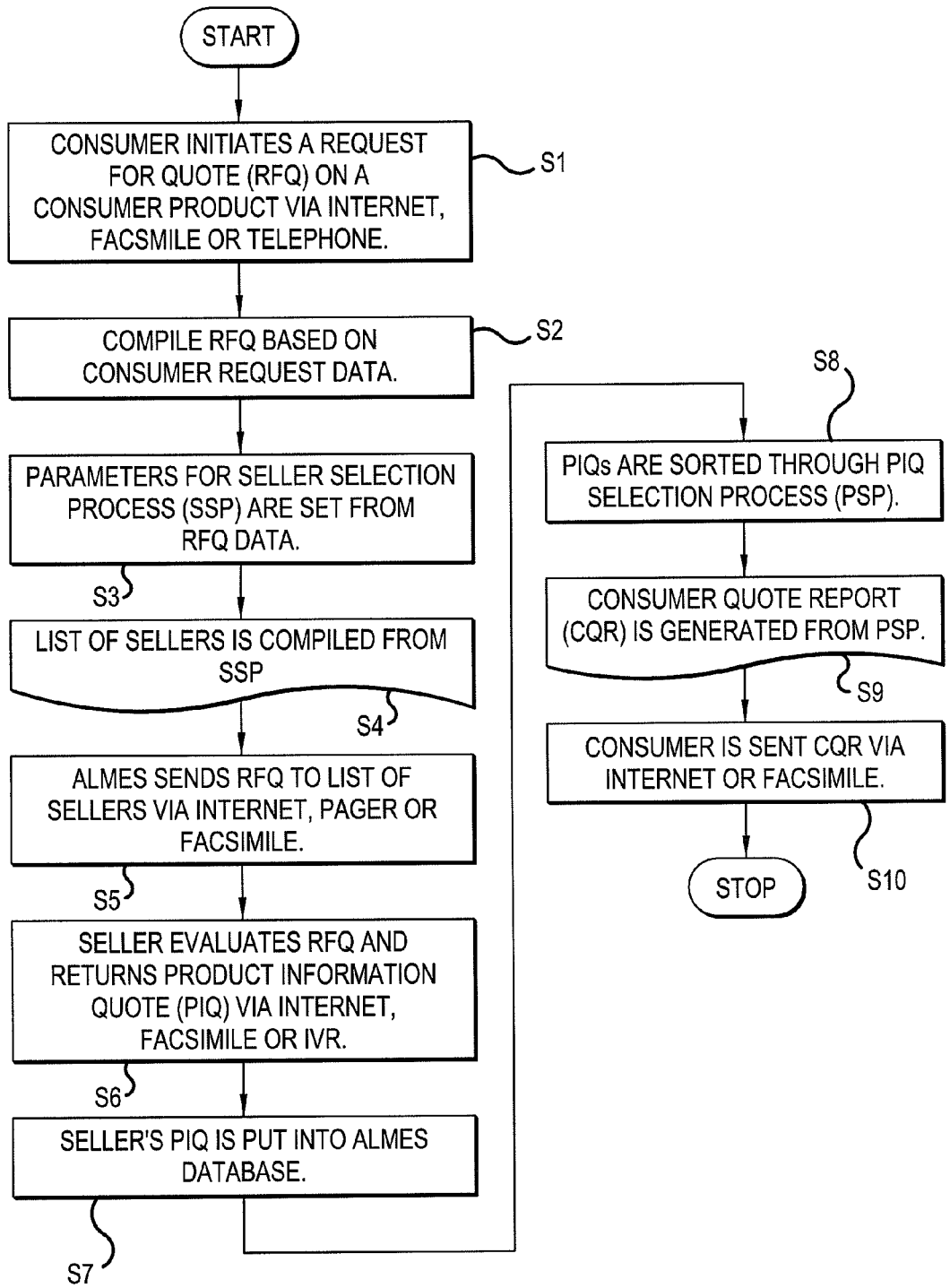
FIG. 2 illustrates a flow chart of the overall method from receipt of a request from a buyer, to receipt of responses from a plurality of sellers, and finally to output compiled and ranked information to the buyer.

FIG. 2 briefly outlines the steps of the process of receiving selected responses from the seller. In step S1, via the internet (or via another medium such as a facsimile or telephone, for example), the buyer initiates a request for a quote (RFQ) which is then received by the ALMES computer in step S2, where the RFQ is compiled. In step S3, the ALMES computer, based on a plurality of predetermined parameters, performs a seller selection process (SSP) to select at least one seller from a plurality of sellers based on, in part, the RFQ data. In step S4, a list of selected sellers is compiled by the ALMES computer based in part on the SSP. In step S5, the ALMES computer transmits the RFQ to each of the listed sellers via the internet, (or alternatively via a pager, or by facsimile, for example).

In step S6, when a terminal of a seller receives the RFQ, the seller evaluates the RFQ. Thereafter, the seller transmits a product information quote (PIQ) via the internet, for example (or facsimile for example) which is received by the ALMES computer in step S7 and entered into the ALMES database.

In step S8, a selection process occurs by the central computer selecting, compiling and ranking the quoted goods (with a relatively highest ranking) based on the information in each PIQ provided by the sellers, and additional information stored in the ALMES computer. This is known as the PIQ selection process (PSP). In step S9, the ALMES computer, from the PSP, produces a consumer quote report (CQR) for transmission to the terminal of the consumer. This report includes the compilation of the sellers products performed by the ALMES computer. Finally, in step S10, the CQR is transmitted to the consumer via the internet or by facsimile, for example. The total time interval from step S1 to S10 can be 90 minutes or less, for example.

Figure 3:
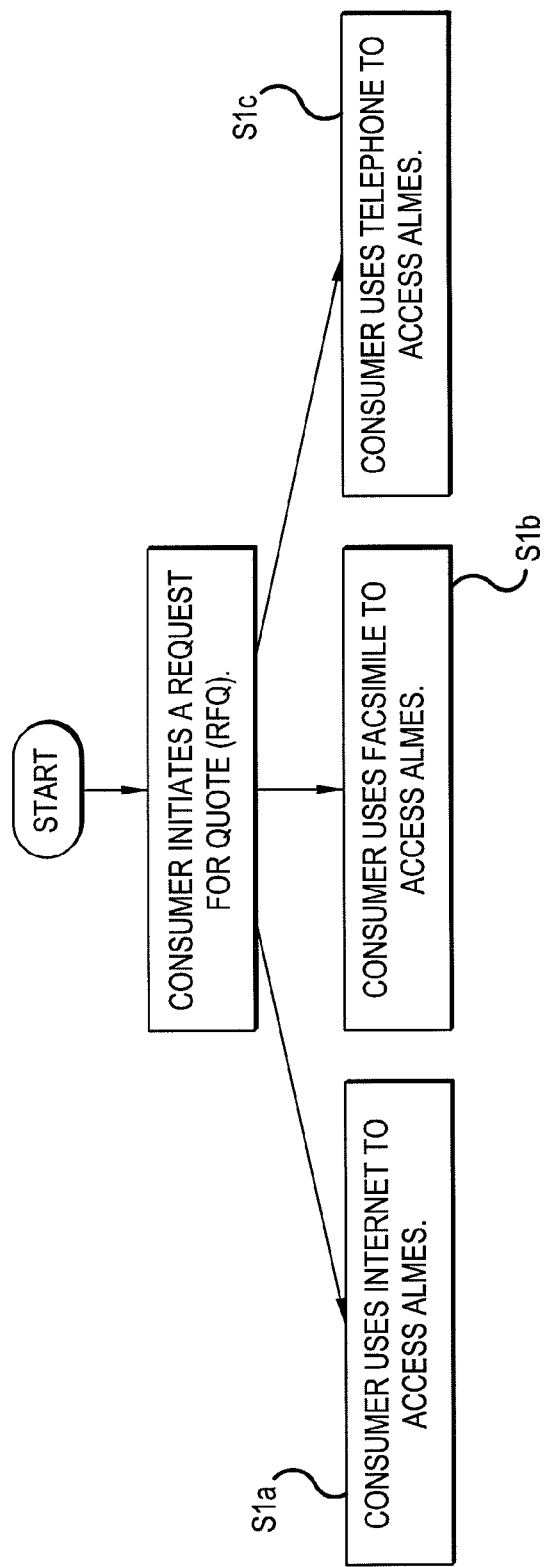
FIGS. 3-6 illustrate alternative methods for receipt of information from the buyer in step S1 of FIG. 2.

FIG. 3 illustrates some aspects of alternative media for transmitting an initial request (RFQ) to the ALMES central computer in step S1 of FIG. 2. The alternative media can include, but are not limited to, the internet, a facsimile (S1b), or a telephone (S1c). A personal computer can be used by the consumer to send such a request via any of the aforementioned media, if equipped with a modem or equivalent device.

Figure 4:
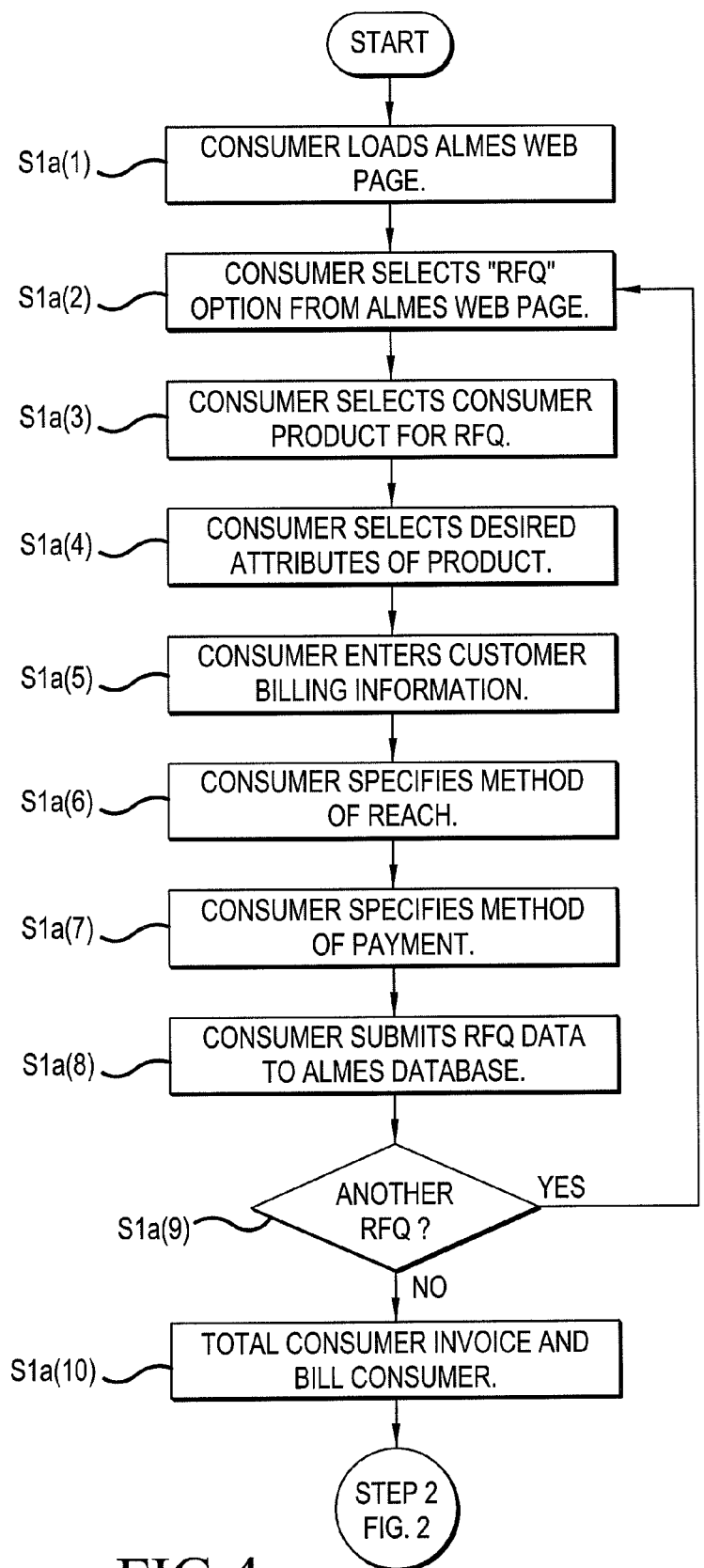

FIG. 4 illustrates the process followed by a consumer utilizing the internet, S1a of FIG. 3. In step S1a(1) the ALMES central computer downloads information from the ALMES web page, to the terminal of the consumer. The ALMES web page contains an RFQ option which can be selected in step S1a(2). In step S1a(3), the consumer selects a product for the RFQ using his computer terminal. In step S1a(4), the desired attributes of the product representing the selected attributes or criteria of the consumer, are selected and entered. In step S1a(5), billing information is input by the consumer.

In step S1a(6), the method of reach (e.g., telephone, facsimile, internet, etc.), for communicating with the system central computer, is specified by the consumer. In step S1a(7), the method of payment is specified and entered. In step S1a(8), the consumer submits, for transmission, to the ALMES central computer, the completed RFQ. If another RFQ is requested, this is done in step S1a(9) and steps S1a(2)-S1a(8) are repeated. If no other RFQ is required, an automatic billing is performed by the ALMES central computer and the consumer is billed automatically by the ALMES central computer in step S1a(10).

Figure 5:
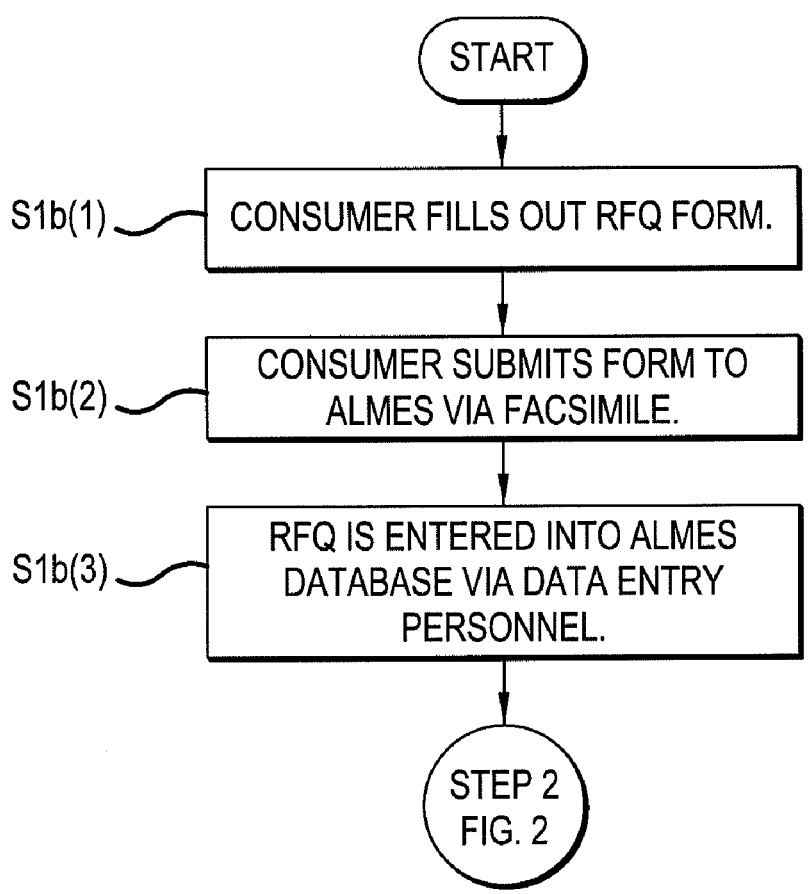

In FIG. 5, a process for communicating with the ALMES database central computer via facsimile is described, as illustrated broadly in step S1b of FIG. 3. In FIG. 5, the RFQ form, which can appear on the screen of the consumer computer terminal, is loaded with data necessary to complete the RFQ form as indicated in step S1b(1). Alternatively, this RFQ form can be filled out by hand. In step S1b(2), the form is transmitted to and received by the ALMES computer, either by a facsimile associated with the originating terminal or by a separate facsimile. In step S1b(3), the received RFQ is entered into the ALMES computer. The entry of this information can be, for example, by keyboard, scanning, voice, or conventional structure available for entry of data.

Figure 6:
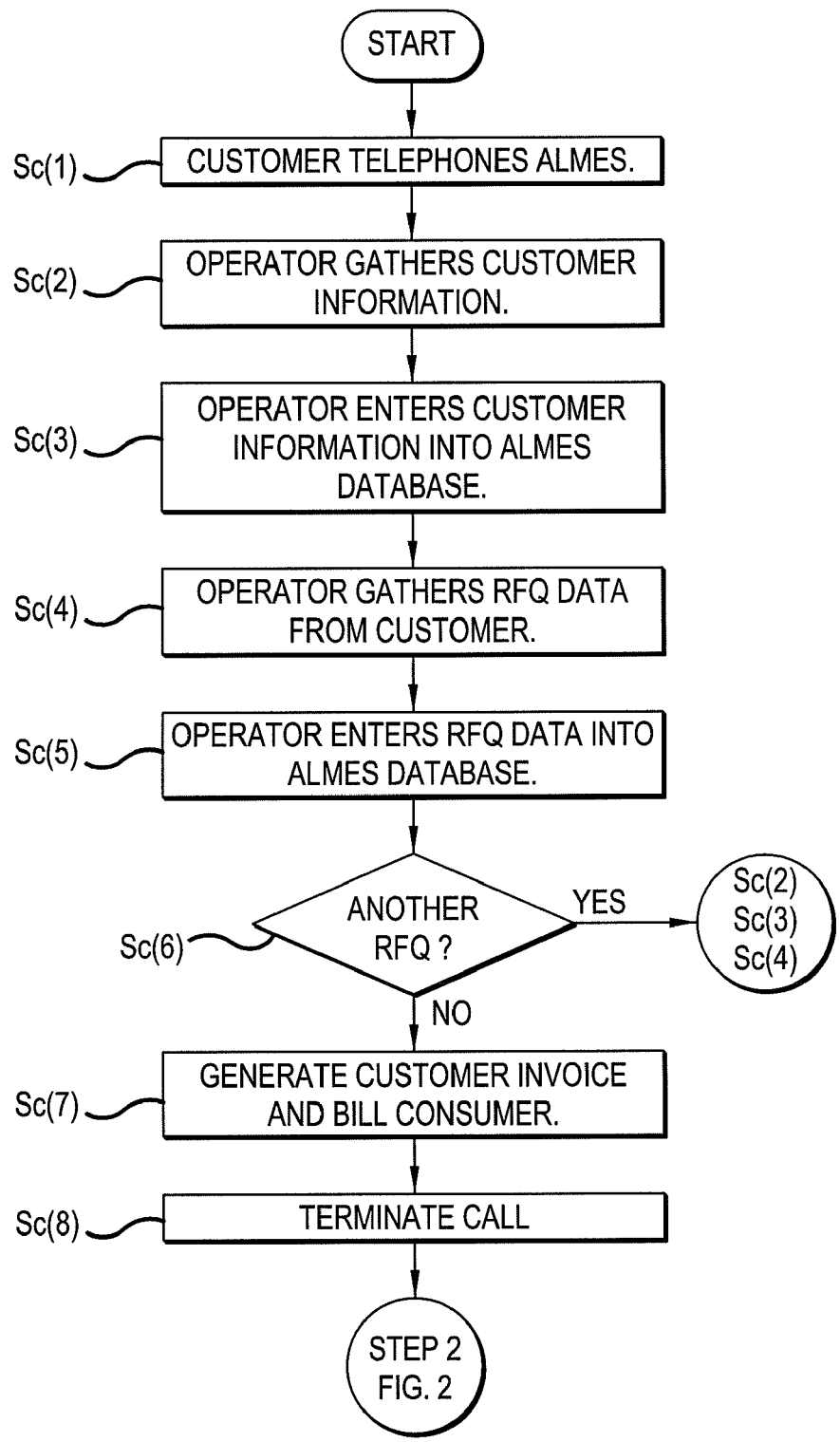

Finally, FIG. 6 represents the process used for initiating communication with the ALMES central computer via telephone. The telephone can be part of the originating consumer computer terminal or can be a separate telephone. A telephone is used in communicating with the ALMES central computer step Sc(1) by the consumer first telephoning the ALMES central computer. In step Sc(2), an operator at the ALMES central computer gathers information about the customer. In step Sc(3), the information is entered into the ALMES central computer. In step Sc(4), the RFQ data is gathered by an operator. In step Sc(5), the RFQ data is entered into the ALMES central computer. In step Sc(6), if there is another RFQ requested, steps in Sc(2), Sc(3), and Sc(4), are repeated to enter another RFQ. Thereafter, the ALMES central computer generates an invoice and the consumer is billed in step Sc(7), and the call is terminated in step Sc(8).

Figure 7:
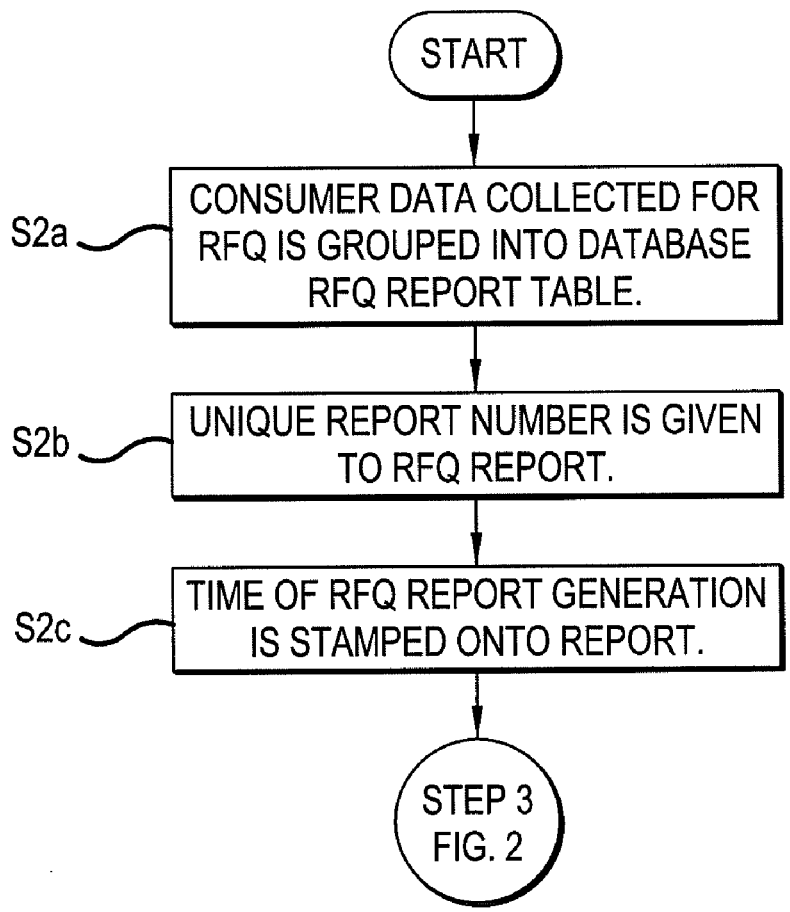
FIG. 7 illustrates the steps performed in step S2 of FIG. 2.

FIG. 7 illustrates how the RFQ is compiled in step S2 of FIG. 2 at the ALMES central computer. The data is collected for the RFQ and is grouped into a database RFQ report table in step S2(a). The central computer then generates a unique report of the central computer number for the RFQ report in step S2(b). Thereafter, the time of the report is generated, for example, by the central computer and is stamped on the report in S2(c).

Figure 11:
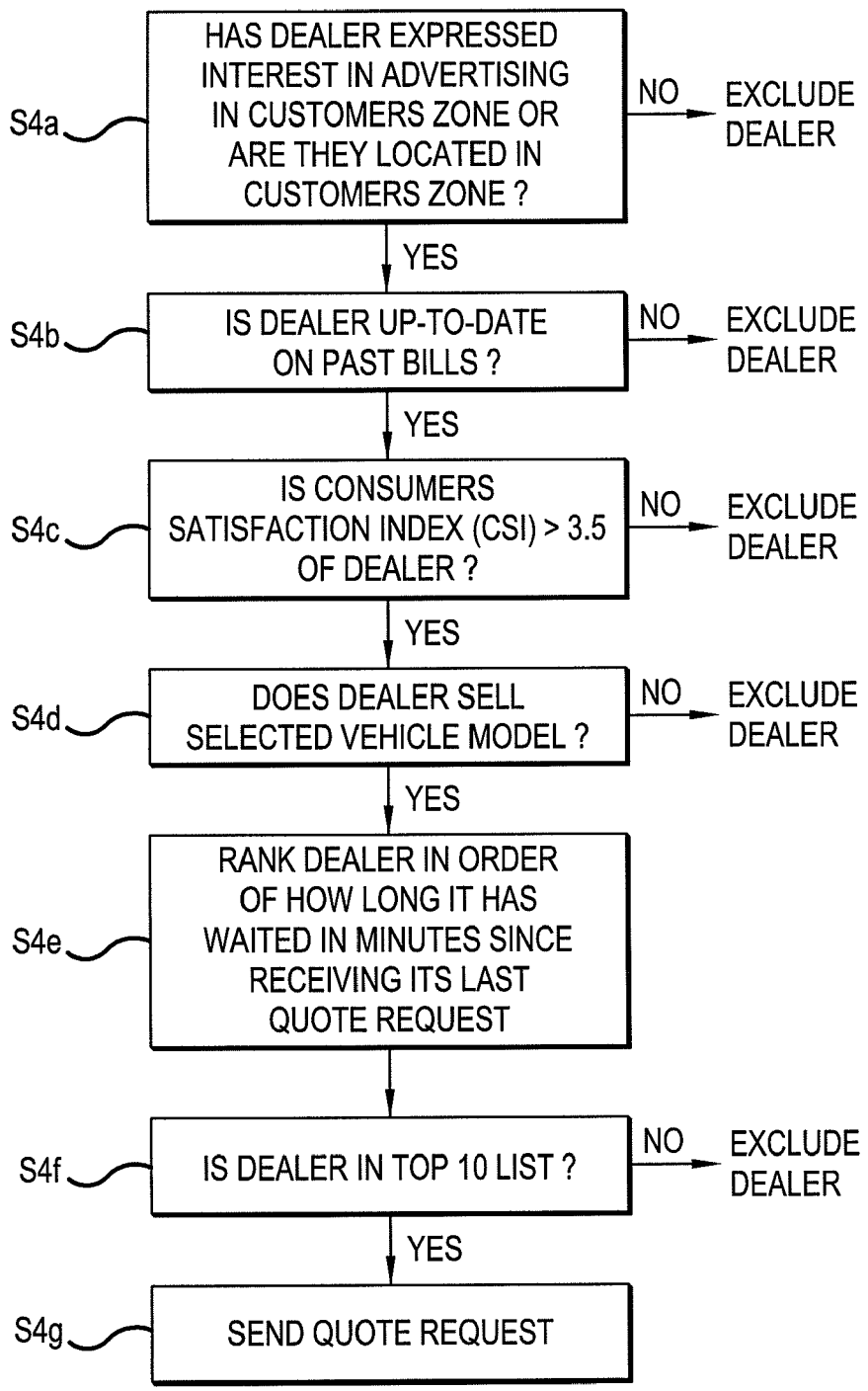
FIGS. 11 and 12 illustrate the process of selecting sellers to receive a request from the buyer.
Figure 12:
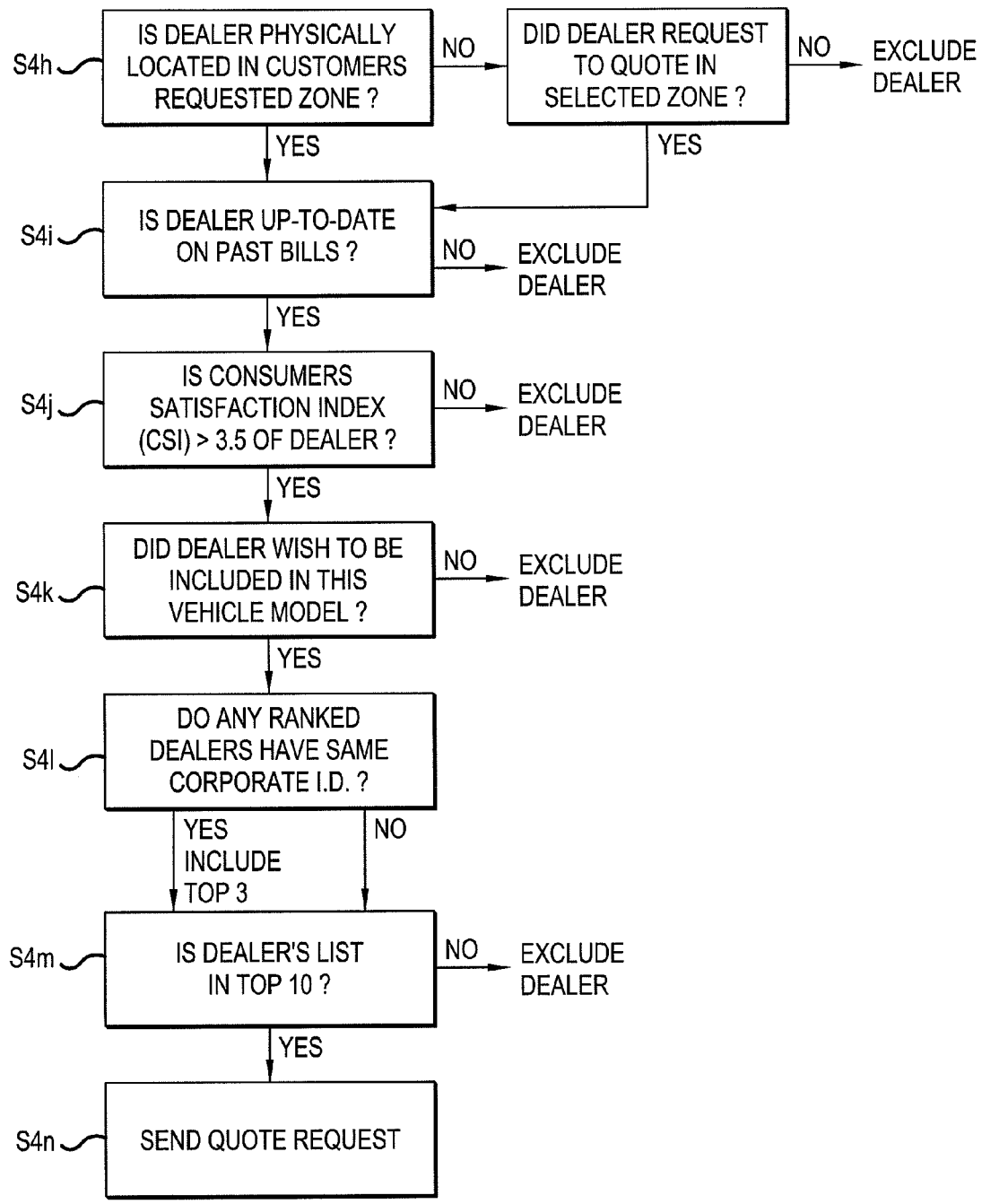

FIG. 1 illustrates one embodiment describing how sellers are selected and notified of the buyers request. The example shown in FIG. 1, illustrates seller computer terminals 12, 13, and 14. These computer terminals are each associated with a specific seller. An example of how the specific sellers are selected by the structure of the central computer 11 of FIG. 1 is illustrated in FIGS. 8, 11, and 12.

Figure 8:
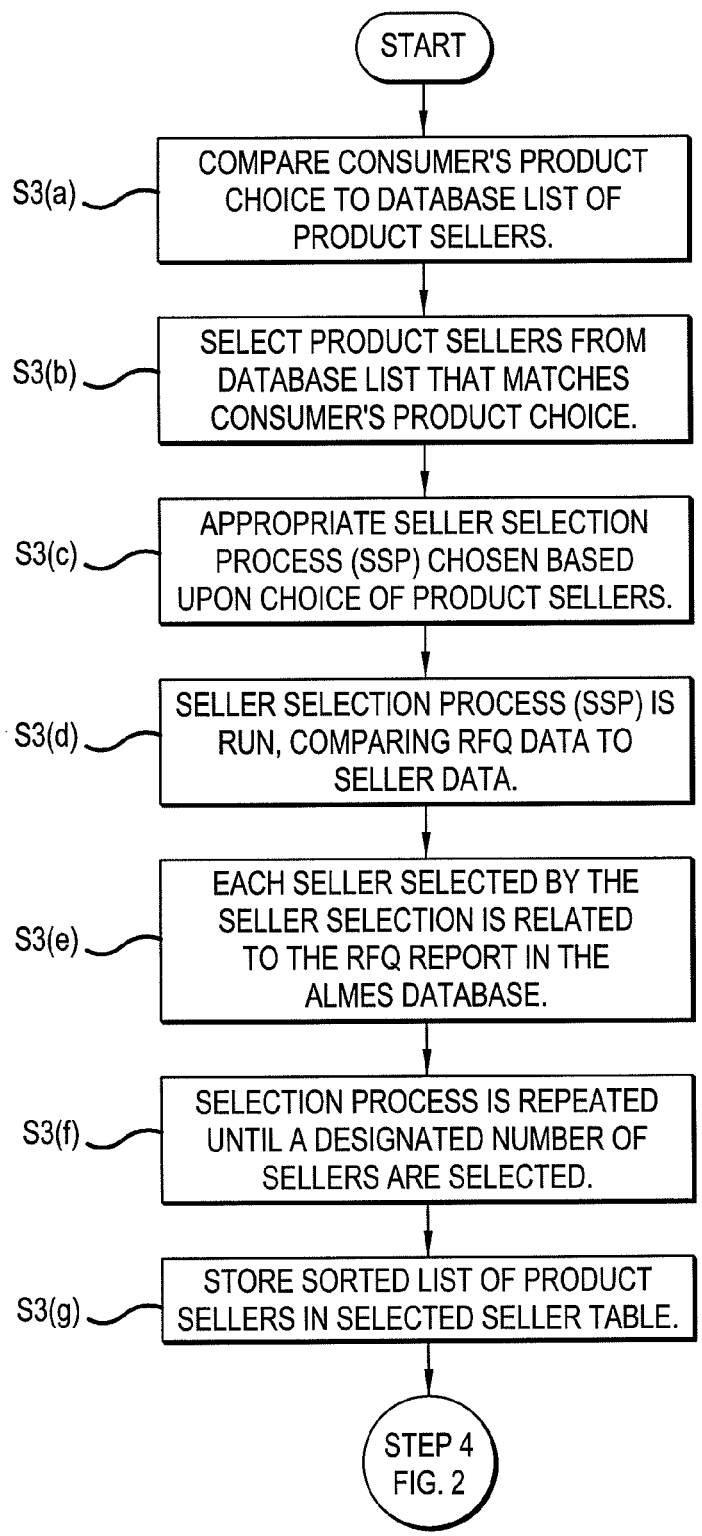
FIG. 8 illustrates the steps performed in step S3 of FIG. 2.

In FIG. 8 in step S3(a), the product chosen by the consumer is compared to a prestored database list (stored in memory, not shown) of product sellers. In step S3(b), product sellers are selected from the database list that match the unique consumer criteria (e.g., a first group of a plurality of sellers who sell the desired product). In step S3(c), appropriate seller selection is made based upon the choice of the product sellers. In step S3(d), seller selection process (SSP) is run by comparing RFQ data to the seller data. In step S3(e), each seller selected by seller selection process is associated with the RFQ report in the ALMES computer. In step S3(f), the seller selection process is repeated until a designated number of sellers are selected by the central computer and then in step S3(g) the list of product sellers (i.e., a subgroup of sellers in the first group) that are selected is stored in the database of the central computer 11. These selected sellers are then sent a request for response based upon the consumer request. Examples of the seller selection process (SSP) are set forth in the description of FIGS. 11 and 12 below.

Figure 9:
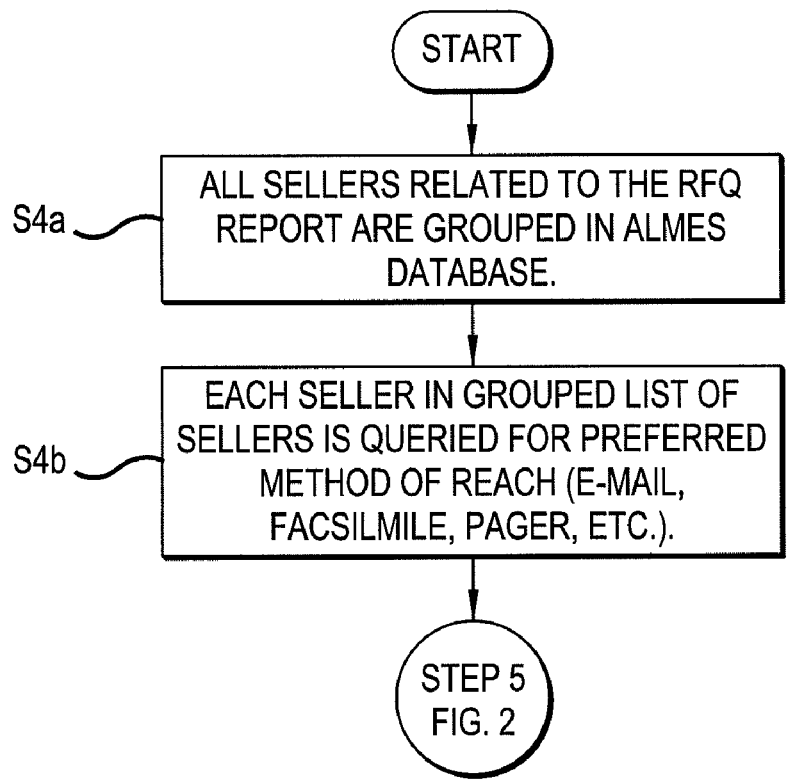
FIG. 9 illustrates details of steps performed in step S4 of FIG. 2.

FIG. 9 illustrates the steps performed in the central computer 11 compiling the list of sellers which will receive the RFQ as indicated in step S4(a) of FIG. 2. In FIG. 9, in step S4a, all sellers related to the RFQ (sellers that sell the product requested by the consumer, for example) are grouped in the database of the ALMES central computer. Thereafter, in step S4(b), each seller in the group list of sellers is queried for a preferred method of reach. That is, the sellers have the option of being communicated by electronic mail, facsimile pager, etc.

FIG. 10 illustrates a computer display screen representing information that can be input to define the request of the buyer. The information on the screen is sent to the ALMES computer. The displayed screen information could be in the format of a form. In FIG. 10, various items of information can be entered as represented by different categories. The example of the screen in FIG. 10 is for an automobile. Other screens related to different products and services, with different key criteria, can be used.

As illustrated in FIG. 10, the consumer identifies himself by name, address, and method of reach in category A. The type of automobile is entered in category B. If a used car is desired, information such as a maximum number of acceptable miles and a maximum acceptable age in years can be entered. The accessories requested are entered in category C. Other information, for example financing information in category D, potential aftermarket products in category E, trade-in information in category F and payment service (e.g. ALMES system service), can also be entered by a user in his quote request. Some of the categories need not be completed, such as trade-in and financing (categories F and D). This option will depend on the buyers requirements. Categories B to F can be used in the selection process of sellers as described in steps $S_2$ and $S_3$ of FIG. 2.

Additionally, information such as the address of category A can be used to select sellers with a predetermined geographic region, for example. Information can additionally be entered by the buyer to assign a predetermined weight to specific criteria which is important to the buyer as will be explained with regard to FIG. 14. The aforementioned information criteria are representative examples only and, of course, the screen can vary depending on the item that is to be purchased.

FIGS. 11 and 12 illustrate examples that can be used by the ALMES central computer in selecting at least one seller for receipt of the product request of the buyer, based on predetermined (criteria) information received with the request of the buyer, and other criteria. For illustrative purposes, FIG. 11 represents a selection of dealers (from a prestored group of dealers) of new cars, while FIG. 12 represents a selection of dealers (from a prestored group of dealers) for used cars.

In step S4a of FIG. 11, it is initially determined, based upon the geographic location of the customer, whether the dealer has expressed an interest in advertising in a customer zone (geographic location of the customer) or if the dealer is located in the customer zone. If the answer is no, the dealer is excluded and therefore, will not be transmitted a request for response. In step S4b there is an inquiry made as to whether or not the dealer is current on bills due to the owner of the system. If the answer is no, the dealer is excluded. If the answer is yes, the procedure is followed to step S4c. Note that the exclusion of dealers refers to the exclusion of one dealer from the group of prestored dealers that sell the product desired by the customer. For each of the dealers in this group of prestored dealers that sell the product, the procedure of FIG. 11 (or FIG. 12) is repeated and is used to select a predetermined number of dealers (ten for example), which will receive a request for response (request for quote).

In step S4c, an inquiry made as to whether or not a consumer satisfaction index (CSI) of the dealer is greater than a predetermined threshold, for example 3.5 out of a possible 4. Criteria for developing such a CSI can include customer satisfaction information received by past customers of the buying service. In this step, dealers who have a poor CSI are excluded by the central computer and if they have an acceptable CSI, the process proceeds to step S4d.

In step S4d, there is an inquiry as to whether or not the dealer sells the vehicle and model of automobile specified by the consumer in the initial request. If not, the dealer is excluded. If so, then the process proceeds to step S4e wherein the central computer 11 ranks the dealer among other dealers based upon a predetermined amount of time waited (in minutes for example) since receiving a last request for quote. In step S4f, there is an inquiry if the dealer is in a top ten list. In other words, all "qualified" dealers are ranked in step S4e to ensure that each receives an equal amount of requests. If the dealer is not in the top ten list in step S4f, then the dealer is excluded. Once all dealers in the prestored group have been processed, then the quote request is sent to the selected predetermined number of dealers.

FIG. 12 represents an example of the selection process for used vehicle dealers. In step S4h1, the ALMES central computer determines if the dealer is physically located in the geographic zone requested by the consumer. If not, the dealer is excluded by the central computer unless the dealer has requested to provide a quote in the selected zone in step S4h2. In step S4i, the central computer determines if the dealer is up-to-date on bills, and if not, the dealer is excluded. In step S4j, the central computer determines if the dealers consumers satisfaction index is greater than 3.5. If not, the dealer is excluded. The central computer determines in step S4k, if the dealer wants to be included in a sale of the vehicle model identified by the consumer. If not, the dealer is excluded. If so, the central computer determines in step S4l, if the ranked dealers have the same corporate ID (in other words, are the ranked dealers owned by the same corporation). If so, only the top three dealers of those including the same corporate ID are included in the top 10 list. In step S4m, the central computer determines which dealers are in the top ten list, selects these dealers, and transmits a quote request in step S4n to the computer of the selected dealers. Note that the aforementioned flow charts of FIGS. 11-12 merely illustrate an exemplary aspect of the dealer selection process of the present application and should not be considered as limiting the selection process to the selection criteria specified therein.

The computer of the dealer receives the request for a quote. The computer of the dealer can continuously monitor the internet for the requests for quotes from the central computer 11. After the quote is received, the dealer may submit a quote.

A screen of the computer of a dealer is shown in FIG. 13. The information on the screen is sent to the dealer in formulating a quote on the computer of the dealer. For example, displayed on the screen is identification information, vehicle location, vehicle specification, accessories included, pricing information, financing information, and leasing information. This screen shown in FIG. 13 is only an example and of course, additional or different categories of information can be added depending on the product being offered.

Within a specific predetermined time period (which can be varied and can be, e.g., sixty minutes), by the central computer, the computer of the dealer must forward a quote to the central computer 11. If the computer does not receive a quote from the dealer within the predetermined time period, then any quote thereafter received will not be accepted. With regard to all dealer quotes received by the central computer 11, within the predetermined time period, the quotes of the dealers are compiled and ranked by the central computer 11. The central computer 11 will not accept quotes from dealers that are not received within the predetermined time period originally set in the quote request sent to the dealer.

The screen shown in FIG. 13 lists specific categories of information related to an automobile (assuming that the dealers are to submit quotes related to an automobile). The screen used will vary dependent on the product of services. The categories of information include identification of the dealer, along with specific "automobile" categories including vehicle location and specifications, accessories, pricing information, financing information, and leasing information. All items need not be completed. Based on all information supplied, a quote is processed by the central computer 11 for the buyer as will be explained further with regard to FIG. 14.

FIG. 14 illustrates an example of how the quotes (received within the predetermined time interval) of the dealers are compiled and ranked by the central computer 11. As illustrated in the first and third columns of FIG. 14, there is an inquiry as to whether criteria, designated in the request by the buyer, has been matched by the quote of the dealer. This criteria is assigned a predetermined weight such that, for each element of information matched by the dealer quote, a predetermined weighted value is assigned. Then, each of the matched weighted values are added together to produce a total value for the dealer quote. Total values for all dealer quotes received within the predetermined time interval are then compared and ranked, and the top ten, for example, are output in their ranked order, for access by the buyer (see FIG. 15).

In the second and fourth columns of FIG. 14, the compilation involves calculating and assigning the aforementioned weighted values to the matched items by the central computer. These can include, but are not limited to, model, series, style, price, (geographic) zone, etc. The most critical criteria are weighted the heaviest (i.e., model=80 points, series=40 points, style=30 points, etc.). Note that criteria other than price are used in selecting and ranking dealer quotes.

The box indicated by the heading "notes," further defines qualifications on matching as accomplished by the central computer. Note (1) refers to co-dependent criteria. For example, note (1) corresponds to vehicle series. Thus, only if the quote from the dealer matches the model and the series requested by the buyer, then a value of 40 is given to the dealer quote (since series LX, for example, is only important if it corresponds to the desired model). If model was not a match, then no value for "series" is given to the quote, irrespective of whether or not "series" is a match.

In note 2, if the price quoted is within the range request by the buyer or less than the requested range, then a weighting value of 15 is given to the quote.

With regard to the "other" criteria, a buyer may not only designate a particular important feature of a product, but the buyer can also assign the feature a weight. Thus, if the vehicle desired must be a convertible, for example, then the buyer can assign this feature a weight of 100, for example. Alternatively, all weights could be variable and assignable by a buyer.

Finally, as shown by notes (5) and (6), matches can further be qualified. For example, note (6) specifies that a match only occurs if it is a positive match. This refers to the fact that for "leather," for example, a match is only counted, and 4 points are awarded only if "leather" is selected and the dealer quoted vehicle has leather. To the contrary, if the buyer does not select "leather" as an option and the quoted vehicle also does not have leather, no match is determined and no points are awarded (this would be a negative match).

The weighting factors and values are only exemplary, as are the conditions noted in FIG. 14. After the weighting is completed, based on the quote information supplied by each of the dealers being compared to the request of the buyer, a ranking of the dealers that supplied quotes within the predetermined time interval is automatically performed at the ALMES central computer 11.

After the dealers have been ranked by the central computer 11, this ranking is output and made available to the customer. For example, the rankings, in the form of a report, can be transmitted to the computer terminal of the consumer illustrated in step S10 of FIG. 2. The ranking list will preferably show the dealers in a sequence based on the ranking done by the central computer 11. Alternatively, the consumer can be notified that a quote report has been completed (via electronic mail, facsimile, etc.), the consumer can be sent a password, and the consumer can then access the quote web site, for example, the auto web site on the internet and retrieve his quote report using the password.

FIG. 15 is one example of a generated quote report wherein dealers represented by terminals 12, 13, and 14, as illustrated in FIG. 1, have been ranked. Dealer 13 is ranked A, dealer 12 is ranked B, and dealer 14 is ranked C. This report and ranking is only illustrative as an aid in understanding the present invention.

The report in FIG. 15 includes different categories of information, for example, vehicle information, warranty information, financing information, specifications, and additional dealer comments. The specification information relates to the quoted vehicle. Also, the quotes provided by the dealers are ranked on the report, wherein the quote of dealer 13 is the best match and is therefore labeled "A," dealer 14 is labeled "B," and dealer 15 is labeled "C." The designation of the dealer with the best quote (A) and the worst quote on the report (C) was previously explained regarding FIG. 14.

Dealers 13, 14 and 15 are identified to the buyer by name and address. The information is obtained from the seller's report for example, as shown as a screen in FIG. 13. The ranking of the dealers (to determine which quotes appear on the report and the ranking within the report), as represented on the report, is done as described above with reference to FIG. 14.

After the consumer has received the quote report, the consumer can, if he chooses, select a quote. The quote can be accepted either through ALMES central computer 11 or directly from the dealer.

Also, after a sale is made, sellers can be informed of comparative quotes submitted by other sellers. These preferably would not involve identification of any seller.

Figure 16:
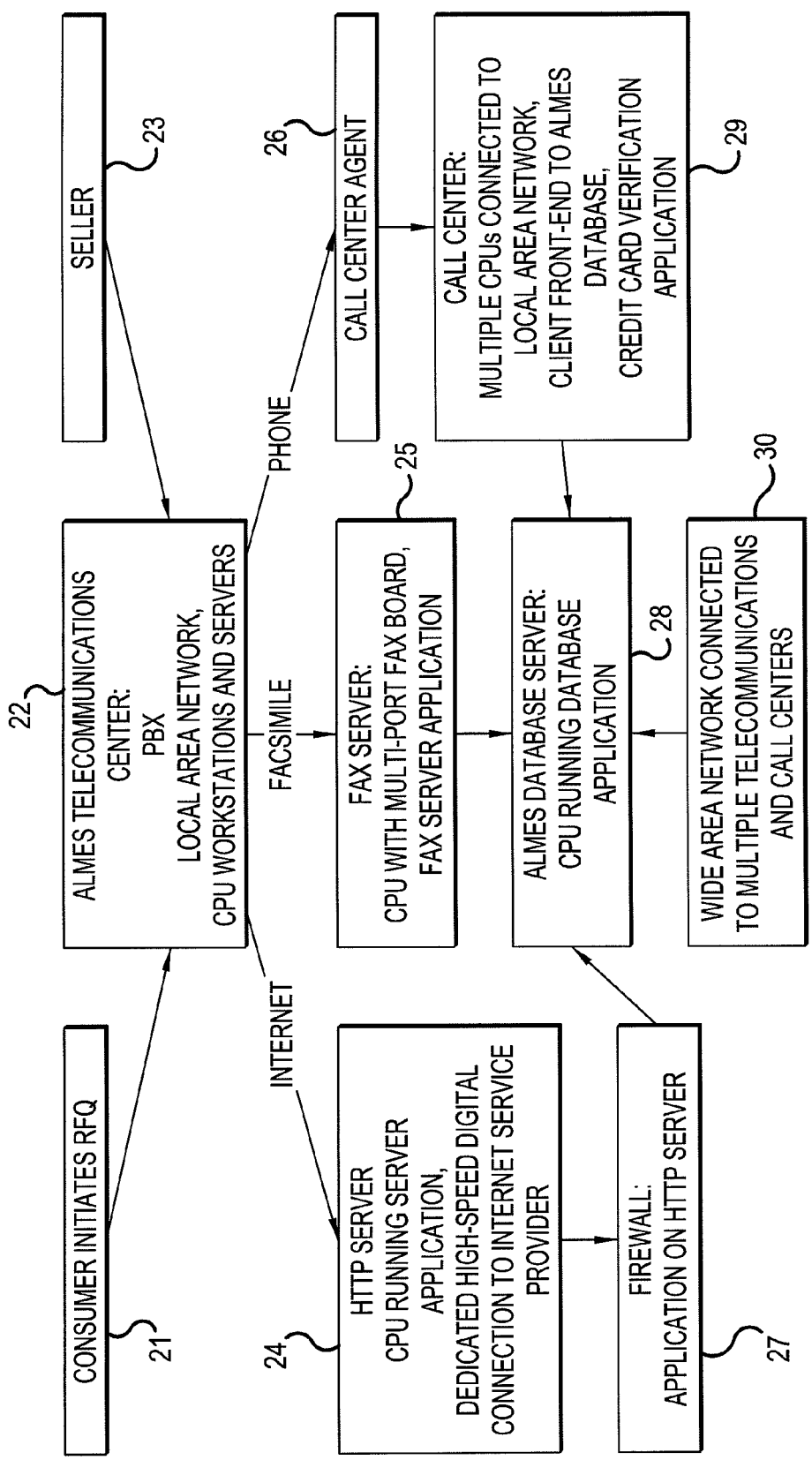
FIG. 16 is a representation of alternative structure for communicating with a central computer of the system.

FIG. 16 represents another example of structure that can be used to alternatively communicate with the central computer 11. For example, element 21 represents the computer terminal of the consumer. The consumer computer can be used to communicate with a telecommunications center 22. The terminal of the seller 23 can also be used to communicate with such telecommunications center 22. From the telecommunications center 22, the internet can be used to communicate with a dedicated server 24 via a dedicated line and from there to an application on the server 27 and thereafter to the ALMES database server 28. As an alternative, a facsimile apparatus can be used to communicate with the ALMES database server 28 via a fax server 25. Alternatively, a telephone apparatus can be used to communicate from the telecommunications center 22 to a call center agent 26, to call center 29, and then to the server 28. A wide area network 30 can also communicate with the server 28.

The present invention has no pre-defined inventory of product (or service) information for the consumers to access and is not limited to automotive products. Instead, the method and apparatus provides a real-time conduit for buyers to specify the exact product desired with specific criteria. The seller is also provided with a "real-time" system for transmitting information back to the buyers on the specific goods requested. The system receives a considerable amount of buyer information which is then provided to a seller, prior to participating in a response to the buyer (a quote based at least on the buyers information). Thereafter, the system may or may not select the seller to provide information which will ultimately be made available to the individual buyer.

After buyer information is input, the apparatus automatically selects sellers to contact by analyzing a multitude of seller and buyer information (criteria). This information (criteria for seller selection from a group of prestored sellers) includes, but is not limited to, geographic data, proprietary customer satisfaction index (CSI) ratings, product availability, history of providing information, outstanding invoices, seller preferences, buyer preferences, etc. Depending on the product, a buyer may elect to search for the product information over a wide geographic area (e.g., the United States) or even a local geographic area (e.g., Baltimore, Md.). Likewise, sellers can elect to submit data to buyers based on the buyers physical location. By matching sellers and buyers by geographic presence and other criteria automatically, the apparatus improves both the liquidity and efficiency of the market for the goods desired. The result is a more competitive market and thus a better shopping situation for buyers. Thus, with the system and method of the present invention, buyers and sellers can engage in a computerized, silent, and secret auction without any human intervention.

Additionally, the computer system will automatically bill the report feature to the buyers credit/charge card. After automatic payment, the buyers have access to the system template of buying options. After selecting the desired product, the buyer may direct the system to access sellers of that good and place them in a live auction situation. Then, within a buyer defined time for example, a report will be automatically generated and made available and accessible to the buyer. This accessibility can be done by facsimile, electronic mail, web page, U.S. mail, etc. The buyer selects how he would prefer to receive the auction data. No human intervention is needed.

Also, sellers may sign up to participate in auctions by filling out an application form on-line for subsequent storage in the central computer database. Then the seller will be eligible to receive buyer information and to submit quotes back to buyers through the present system. The computer system will automatically generate and send (via electronic mail, facsimile, or world wide web page) an invoice to participating sellers. Sellers can elect to pay both by conventional means (check or credit card) or by some form of internet cash. If sellers are current on their bills, they remain eligible to continue using the system. The entire loop for sellers and buyers can be accomplished without human intervention. Thus, it is completely automatic.

Additionally, buyers and sellers can research market conditions using the database of the present invention. For individuals interested solely in market data, the present database will permit customized inquiries of both historical and real-time information. To judge the market price of goods an individual can request to "watch the market" from their personal computer or other device with internet access. Buyers or sellers merely enter a few parameters into the internet web page of the system and will then be granted access to a "ticker-tape" type of market information on specific goods for particular regions of the world. Here the individuals will not be receiving information customized to their specific needs and there is no contact with the sellers. Individuals would merely be watching others request and receive information in order to judge general market conditions. Information will be limited so to not undermine the use of the trading system as of the present invention.

The buyers and sellers can directly contact each other after the market information has been conveyed to the buyers. The buyers can decide which one or more of the plurality of quoting sellers they wish to contact when the information is received from the present system. In other words, the dynamically generated report, which can be on the internet, may contain hyperlinks to the participating sellers. Buyers will be able to instantly communicate with the seller perhaps to purchase the product, to request more information, or to put a hold on the goods etc. This communication will be conducted through the present system.

Also, third party advertising can precisely target messages to buyers receiving an auction report. These advertisements will be selected based on buyers and third party advertiser's parameters. Advertisers will be able to control precisely who receives their messages based on criteria they select; geographic location, product specification, demographic information, etc. Advertisers will be automatically billed for every report to the buyer.

While an embodiment of the present invention relates to a method and apparatus for buying automotive equipment such as automobiles, trucks, etc., either used or new, the present invention can be used for purchasing of other goods and services. The present invention provides a system called an Automotive Live Market Exchange System (ALMES) to carry out the present embodiment.

While the invention has been described and illustrated in connection with the embodiments, many variations and modifications as will be evident to those skilled in the art may be made therein without departing from the spirit of the invention and the invention as set forth in the appended claims is thus not to be limited to the precise details of construction set forth above as such variations and modifications are intended to be included within the scope of the appended claims.

What is claimed is:

1. A method for purchasing goods or services from a seller by a buyer, the method being implemented in a network having a central computer system and at least one terminal, comprising:

(a) receiving, at said central computer system, a request from a buyer, using said at least one terminal, for requesting goods or services, said request including a predetermined plurality of criteria related to the goods or services and a predetermined criteria related to sellers of the goods or services;

(b) selecting, by said central computer system, sellers from a predetermined group of at least two sellers that offer the requested goods or services by excluding sellers from said predetermined group of sellers that do not meet the received predetermined plurality of criteria related to the goods and services and related to the sellers, and ranking said selected sellers based on the time that the respective sellers received a last request before said request from said buyer;

(c) transmitting, using said network, the request of the buyer including said received predetermined plurality of criteria related to said goods or services to the selected sellers of the goods or services;

(d) receiving, by said central computer system, within a predetermined time interval, responses from at least one seller to the request;

(e) compiling, by said central computer, information provided in the responses received from at least one seller within the predetermined time interval;

(f) ranking, by said central computer, the responding sellers based upon a weighted evaluation of the compiled information including the plurality of criteria and selecting sellers in order from highest ranking; and (g) providing, to said at least one terminal, the ranked selected sellers and respective responses for access by the buyer.

2. The method of claim 1, wherein said central computer system includes a database containing information for a plurality of sellers including a critical evaluation of each said seller, wherein in (b), selecting is performed by excluding sellers, from said predetermined group of sellers, that have a critical evaluation below a predetermined value.

3. The method of claim 1, further comprising, (h) the buyer, using said terminal, accepting a response provided among the ranked selected sellers through communication with the seller corresponding to the accepted response; and (i) transmitting, using said network, the responses that were provided for access by the buyer to each of the ranked selected sellers.

4. The method of claim 1, wherein in (d), responses are obtained from seller information stored in the central computer.

5. The method of claim 1, wherein in (g), accessing by the buyer is performed by an internet connection.

6. The method of claim 5, wherein the goods are selected from the group consisting of vehicles, computers, or appliances and the services are selected from the groups consisting of legal, financing, medical, or insurance.

7. The method according to claim 6, wherein the goods are vehicles.

8. A system for obtaining information for the purchasing of goods or services, the system being implemented as a network connecting buyers and sellers, the system comprising:

a user terminal programmed to provide an interactive form interface for inputting a request for desired goods or services from a buyer, the form presenting predetermined criteria related to the goods or services and predetermined criteria related to sellers of the goods or services, and transmit to a central computer system the criteria related to the goods and services and the criteria related to sellers of the goods or services that is input in the form;

the central computer system programmed to select sellers from a predetermined group of sellers that offer the requested goods or services by excluding sellers from said predetermined group of sellers that do not meet the received predetermined criteria related to the goods and services and related to the sellers, and rank said selected sellers based on the time that the respective sellers received a last request before said request from said buyer;

said network programmed to transmit the request, including inputted criteria related to said goods or services, of the buyer to the chosen predetermined number of sellers;

said central computer system programmed to receive, within a predetermined time interval, responses from the responding sellers;

said central computer system programmed to compile information provided in the response received within the predetermined time interval, and rank the sellers based upon a weighted evaluation of the compiled information, and select sellers in order of highest ranking; and said central computer system programmed to provide the compiled responses of the ranked selected sellers and respective responses in a report format for access by the buyer using the user terminal.

9. The system according to claim 8, wherein the user terminal is a computer.

10. The system according to claim 8, wherein said central computer system includes a database for a plurality of sellers and a critical evaluation of each said seller, wherein selecting sellers from the predetermined group of sellers is performed by excluding sellers that have a critical evaluation below a predetermined value.

11. The system according to claim 8, further comprising, said user terminal programmed to accept a response provided among the ranked selected sellers through communication with the seller corresponding to the accepted response; and said network programmed to transmit the responses that were provided for access by the buyer to each of the ranked selected sellers.

12. The system according to claim 11, wherein the central computer is further programmed to obtain a response for a seller from information previously provided by the seller that is stored in the central computer.

13. The system according to claim 8, wherein said central computer system is further programmed to provide the compiled responses of the ranked selected sellers and respective responses to said user terminal using an internet connection.

14. The system of claim 8, wherein the goods are selected from the group consisting of vehicles, computers, or appliances.

15. The system according to claim 14, wherein the goods are vehicles.

16. A system for obtaining information from providers for the purchasing of automobiles by prospective buyers comprising:

a computer programmed to receive a request for a desired automobile from a prospective buyer, the request including plurality of predetermined criteria related to the automobile and a plurality of predetermined criteria related to providers of automobiles;

a central computer system programmed to select at least two providers from a predetermined group of providers of the automobile by excluding providers from said predetermined group of providers that do not meet the plurality of predetermined criteria related to the automobile and the plurality of predetermined criteria related to the providers, and rank said selected at least two providers based on the time that the respective providers received a last request before said request from said prospective buyer;

said computer programmed to transmit the request of the prospective buyer including said received predetermined criteria related to said automobile to the selected at least two providers;

the central computer system programmed to receive, within a predetermined time interval, responses from the selected providers;

the central computer system programmed to compile information provided in the response received within the predetermined time interval for ranking the providers based upon a weighted evaluation of the compiled information including the plurality of criteria, and for selecting providers in order from highest ranking; and said computer programmed to provide the ranked selected providers and respective responses for access by the prospective buyer using an internet connection.

17. The system of claim 16, wherein the automobile is a previously owned automobile.

* * * * *